UNITED STATES PATENT OFFICE.

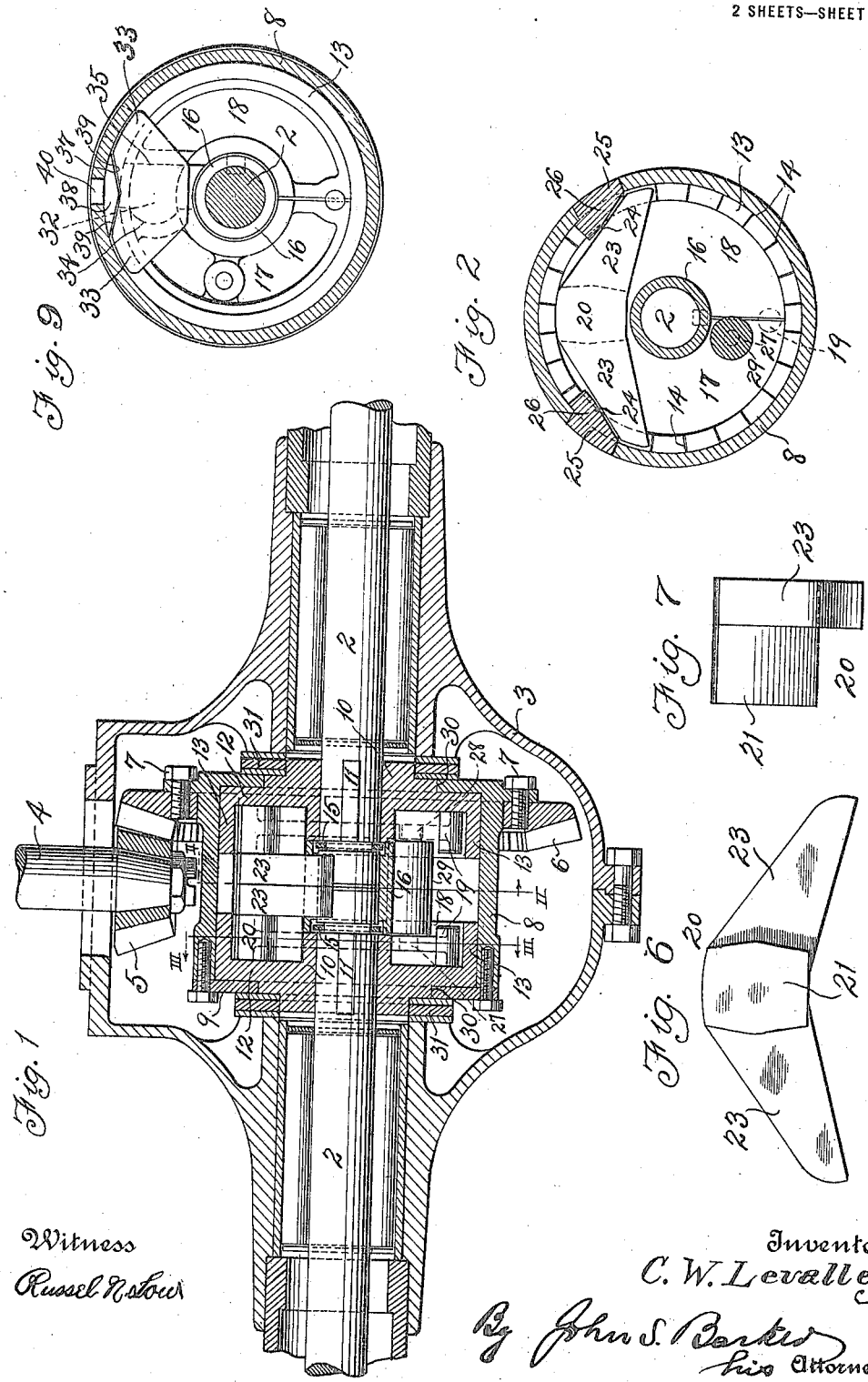

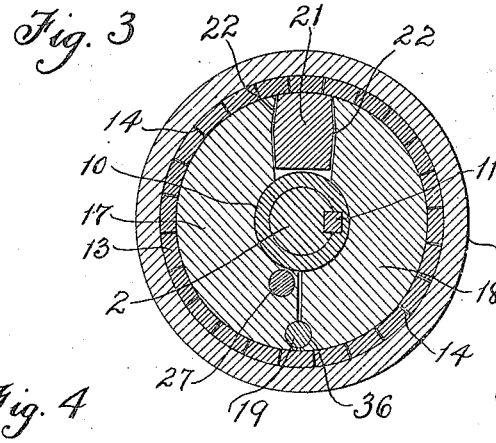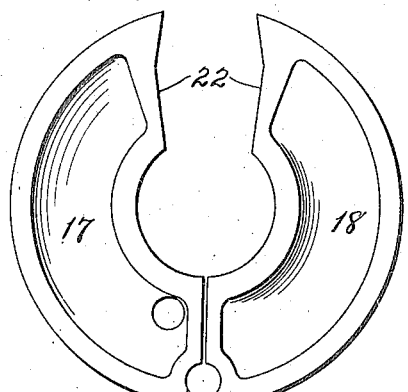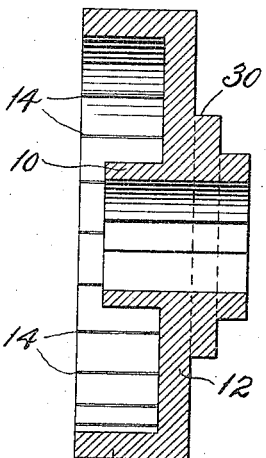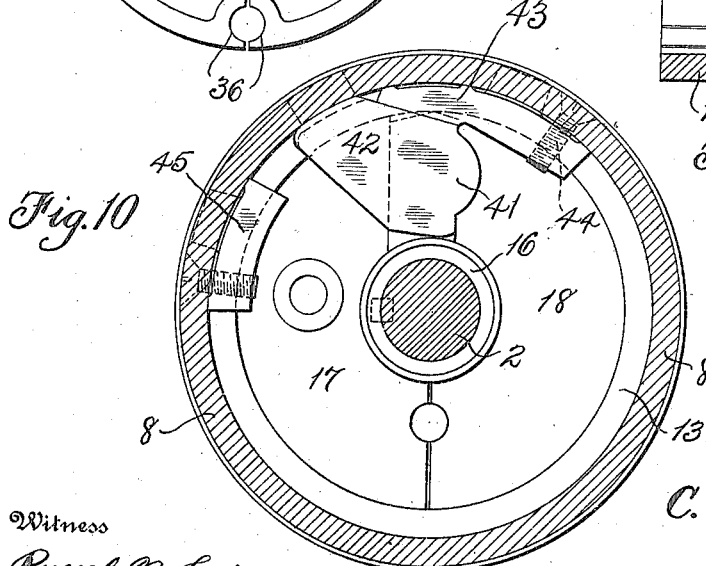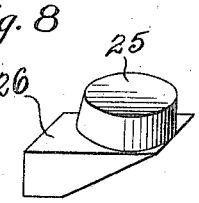

CHRISTOPHER W. LEVALLEY, OF MILWAUKEE, WISCONSIN.

TRANSMISSION-GEARING.

1,264,822.    Specification of Letters Patent.    Patented Apr. 30, 1918.

Application filed July 11, 1916. Serial No. 108,614.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Transmission-Gearing, of which the following is a specification.

My invention relates to that class of transmission gearing, interposed between a driving shaft or motor and a pair of driven shafts, in which provision is made for driving both shafts simultaneously with like speed, or, when the shafts are turning at different speeds, then driving only the more slowly revolving shaft, which remains in connection with the motor, while the other, the faster revolving shaft, is temporarily disconnected from the driving shaft or motor.

The invention has for its object to improve gearing of this kind, the embodiment of the invention here shown having been devised with especial reference to application to a motor vehicle of the lighter kinds.

In the accompanying drawings—

Figure 1 is a horizontal sectional view of a transmission gearing for a motor vehicle embodying my invention.

Fig. 2 is a transverse sectional view taken on the line II—II of Fig. 1.

Fig. 3 is a transverse sectional view taken on the line III—III of Fig. 1.

Fig. 4 is a view illustrating the segments of the expansible friction shoe separate from the other parts of the apparatus.

Fig. 5 is a central sectional view of one of the shaft-connected clutch elements.

Fig. 6 is a front view and Fig. 7 an edge view of one of the clutch-shoe-expanding parts.

Fig. 8 is a detail view illustrating one of the driving pieces for operating the clutch-expanding part.

Figs. 9 and 10 are transverse sectional views illustrating different embodiments of the invention from that illustrated in Figs. 1, 2 and 3.

In the drawings 2, 2, indicate sections of a driven shaft, such as the divided rear axle of a motor vehicle. These are mounted in a suitable housing 3, that represented being of well known form and construction, where they are supported in alinement with each other, their inner ends being brought close together. A motor driven shaft 4 enters the housing and carries a drive pinion or wheel 5 that is in engagement with a wheel 6, the wheels 5 and 6 being preferably bevel gears. The wheel 6 in the arrangement of the invention illustrated consists of an annular ring firmly secured, as by means of bolts 7, to a cylindrical casing 8 that surrounds the contiguous, inner, ends of the driven shafts, inclosing them and the contiguous and associated parts to be described. The casing 8 has one end, 9 easily separable, this being held in place by bolts when the parts of the gearing are assembled.

To each shaft section 2 is firmly secured the driven member of the clutch mechanism for that particular shaft, this part being preferably of the form shown in detail in Fig. 5 and having a hub 10 fitting the shaft and united thereto by a key 11, a web 12, and a flange or rim 13 at the edge of the web. The rim 13 is preferably slit, as represented at 14, to make it more or less resilient, and its outer peripheral face is in close running engagement with the inner contiguous face of the shell of the casing 8; that is to say, these parts are so closely fitted that a very slight expansion of the rim of the clutch member causes a locking frictional engagement between them, but permits them to move freely relative to each other when the rim is not expanded.

The casing 8 is supported upon the driven, shaft-connected clutch members, the webs 12 of which are recessed or rabbeted to form seats for the ends of such casing, as indicated at 30.

A spacing sleeve 16 is loosely fitted upon the contiguous inner portions of the shafts 2, its ends engaging with the inner ends of the hubs of the shaft-connected clutch members, holding them the proper distance apart.

The driven shafts are grooved near their ends, and into these grooves are seated elastic split rings 15 that engage with the ends of the keys 11, when seated, to hold them in place, the parts of the rings that project beyond the periphery of the shafts 2 lying in grooves formed therefor in the inner faces of the end portions of the sleeve 16.

Bearing washers 31 are preferably interposed between the outer faces of the casing 8 and the webs of the shaft-connected clutch members on the one side, and the bearings formed in the housing 3 and in which the shaft sections 2 are supported on the other side.

Mounted within each chamber formed by the overhanging rim of a shaft-connected clutch member is a driven clutch member, which preferably consists of an expansible ring or shoe adapted to have frictional engagement with the inner face of the said rim. This clutch shoe is loosely mounted and is preferably formed of two separate sections, 17 and 18, each of approximately semi-circular segmental shape. Two of the ends of the segments 17 and 18 are brought close together and have formed in them seats 36 for a circular pin 19 that serves as the fulcrum about which the two parts of the friction clutch shoe move. The other ends of the clutch segments are shaped to receive between them, and be operated upon by, the clutch-expanding member 20. This part may be variously shaped, the form illustrated in Figs. 6 and 7 being that preferred and consisting of a head 21 that lies between the ends 22 of the clutch shoe segments, and a pair of arms 23 integral with or secured fast to the head 21, and located laterally to one side thereof so as to be in the space within the casing 8 between the shaft-connected clutch members, as represented in Fig. 1. The arms 23 extend laterally and oppositely from the head 21 and are arranged to be engaged by driving pieces 24 secured to the inside of the cylindrical wall of the casing 8. Each driving piece is preferably formed with a boss or lug 25 that is adapted to fit into a recess formed therefor in the cylindrical wall of the casing, and with a head 26 that rests against the said wall of the casing and is backed thereby, and which also is the part that directly engages with the arm 23 of the clutch-expanding member. This construction is one in which the driving pieces 24 are easily applied or removed as may be required, and are so supported as to be positive in action. There are two of these driving pieces 24 for each clutch-expanding member, one arranged for forward driving and the other for rearward driving, and when one of these parts is in operation the other is inactive. When the casing 8 is turned in a forward direction both the shaft sections 2 will be driven forwardly and at the same speed, through the two sets of friction clutch driving mechanism that have been described; but should one of the shaft sections revolve faster than the other the clutch shoe that is employed to drive that shaft section, and which is at the moment in working engagement with the shaft-connected clutch member, will be carried forward along with the latter, and this will carry the arm 23 of the clutch-expanding member temporarily out of engagement with its driving piece 24, whereupon the friction elements of the clutch will relax and cease longer to remain in driving engagement, thus disconnecting the faster turning shaft from the motor and leaving it free to revolve independently of the other shaft section, which latter remains in driving connection with the motor. This condition will remain until the speed of the two shaft sections again becomes equal, whereupon driving connection with both will be restored; or the shaft that was turning the more slowly becomes the faster turning of the two shafts, whereupon it would lose its connection with the motor, and the other shaft would be instantly put into driving connection therewith. The principle and advantages of a differential gear that thus operates to drive through the more slowly turning driven shaft are well understood and need not be here set out or further explained.

In order to prevent the friction shoe of the faster turning shaft from overrunning relative to the other friction shoe to an undesirable extent, I interpose a connection between the two that permits them to move relative to each other, but only to a limited degree. For this connection I preferably use a straight cylindrical pin 27. This is preferably mounted with one of its ends secured fast in one of the friction shoes while its opposite end is in an aperture or recess 28 formed in the other friction shoe, the diameter of which aperture is a little greater than that of the pin, to permit of a limited amount of free movement between the pin and such friction shoe. The central part of the pin 27 is preferably of greater diameter than its ends, as indicated at 29, this enlarged portion of the pin lying in the open space within the casing 8 separating the shaft-connected clutch members. The enlarged central portion of the pin 27 operates to prevent undesirable longitudinal movement of the pin and also to hold the friction shoes apart and in proper working relationship to the shaft-connected clutch members with which they coöperate.

With this arrangement whenever the faster turning shaft carries forward its friction shoe, such movement does not progress far before it is arrested by the pin 27, the opposite end of which is in engagement with the shoe of the now slower turning shaft that is in driving engagement with the motor. The positive arresting of the forward movement of the clutch shoe, just referred to, causes the two clutch shoes to rotate at like speed, which speed is that of the slower turning shaft, thus positively preventing any considerable overrunning of one shoe relative to the other, and positively holding the shoe of the faster turning shaft in neutral position, that is, one in which it is free from friction engagement with the rim of the shaft-connected clutch element that is at the moment overrunning.

When using friction clutches of the type described and illustrated herein where a friction shoe is expanded and caused to engage with the inner surface of a circular rim, I have found that the shoe comes into frictional engagement with the rim more quickly and certainly, and that there is less liability of slippage between them when the shoe is being expanded if the means that are employed to operate the expander for the friction shoe act centripetally, that is, toward the center, relative to which the frictional faces of the clutch shoe and the rim with which it engages, are concentric. By mounting the driving pieces 24 upon the inner face of the cylindrical wall of the casing 8 and causing them to act upon the outer inclined faces of the rocking arms 23 of the clutch expanders, the force for expanding the friction shoes is applied as just suggested, that is, centripetally, and the clutches are caused to operate quickly and with certainty, and to greater advantage than when the force to operate the friction shoe expander is applied centrifugally or concentrically. The form of transmission gear which I have thus far described is that which I prefer, more particularly when it is used for comparatively light work. My invention, however, is not limited in its useful applications to the single embodiment described.

In Fig. 9 I have shown a form of invention in which a single driving piece for each clutch expander is employed instead of two such pieces as in the construction already described. This modification requires a different form of the clutch expander. Referring to Fig. 9, 32 indicates the head of the clutch shoe expander, and 33, 33 the laterally extending arms connected therewith. The head 32 is formed with a curved face 34 on one side and a flat face 35 on the other, the ends of the segments 17, 18 with which the head engages being correspondingly shaped to fit these faces. In the outer peripheral faces of the arms there is formed a centrally disposed recess 37 in which is located the driving piece 38. The latter is formed with two inclined driving faces 39 arranged to engage with the opposite contact faces of the recess 37. The driving piece is therefore a double wedge that operates, by engagement with the arms 33, to tilt or rock the expanding head 32 and cause the segments of the clutch shoe to be separated and forced into clutching frictional engagement with the rim of the shaft-connected clutch member with which it coöperates. The single driving piece 38 is therefore adapted for either forward or backward driving, acting on one arm 33 when moving in one direction and upon the other arm when moved oppositely. The driving piece 38 is provided with a boss or lug 40 that lies in a recess provided therefor in the cylindrical wall of the casing 8. In this form of the invention, like that already described, the piece that operates the shoe expander operates upon the latter centripetally, with the advantages that have been already pointed out. In Fig. 9 I have represented the rim 13 as not being slit and expansible, as it is immaterial, so far as the features intended to be illustrated by this view are concerned, whether the rim be expansible or rigid.

In Fig. 10 I have illustrated a form of my invention that possesses some advantages, particularly for heavy work. Referring to this view it will be observed that the clutch-shoe-expanding head 41 is similar in its general features to the similar part shown in Fig. 9. This head has connected therewith but one laterally extending arm, 42, with which engages a driving piece 43 carried by the casing 8, this piece being employed for forward driving and arranged to act upon the arm 42 centripetally. It is united to the casing by a bolt 44 and has a driving head backed by the wall of the casing. 45 is a second driving piece arranged for rearward driving. It is secured to the casing 8 in position to engage with the arm 42 on the side thereof that is opposite to that engaged by the driving piece 43.

It will be understood that there is one of the driving pieces 43 for operating the clutch expander of each set of clutch devices; but in practice it is found but a single reverse driving piece 45 need be provided, since the relative amount of backing of the vehicle is so small that it is found sufficient to use but one shaft section and a single drive wheel for that purpose.

I prefer to shape the arm 42 of that friction shoe expander that is operated upon by a forward driving piece only so that its end will rest against the inner wall of the casing when the parts of the clutch are in neutral position, thus positively preventing the expanding device from ever operating the shoe to cause it to engage with the shaft-connected clutch element for reverse driving. The arm 42 of the other driving piece is shorter than that of the one just referred to as indicated by the dotted lines in Fig. 10.

By making the rim 12 of the shaft-connected clutch member yielding as described and shown, it expands into engagement with the inner face of the wall of the casing 8 when the friction shoe is moved into forcible engagement therewith. When this occurs the driving members of the gearing, which include the casing 8 and the expansible shoes, have engagement with the shaft-connected driven member on two opposite faces, an outer engagement between the outer face of the rim 12 and the inner face of the casing, and an inner engagement between the expansible clutch shoe and the inner wall or face of the rim 12. This gives a powerful engagement between the driving and driven elements of the gearing, which nevertheless easily and quickly separate, as has been explained, whenever the driven shaft or part tends to overrun the driving part.

The two shaft-connected clutch elements are cup-shaped, the open chambers which their rims inclose facing each other, and the expansible clutch shoes are located in such chambers, while the rocking arms of the clutch-shoe-expanding devices, and the driving pieces connected with the casing 8 that engage with said arms, are located in the space between the said cup-shaped shaft-connected clutch members.

While I have described and illustrated those elements of the clutch that are connected with the motor with particularity in order to show the preferred forms of my invention, it will be understood that the friction shoe and its associated parts shown are, for some purposes, but typical of a clutch, broadly considered; and that the two-part expansible friction shoe shown is also, for some purposes, but typical of expansible friction shoes, broadly considered; and therefore I wish it to be understood that my invention is not limited in its useful applications to the specific mechanisms which I have herein shown and described, although they are the forms of the invention which I now prefer to use and consider most advantageous and desirable.

What I claim is:—

1. In a transmission gearing, the combination of a driven shaft, a clutch element secured thereto and having a friction rim, a motor-connected driving element, and means operated by the last named element for uniting said driving element in driving connection with the opposite faces of the said friction rim of the driven clutch element.

2. In a transmission gearing, the combination of a driven shaft, a clutch member secured thereto and provided with an expansible rim, a motor-connected driving element closely surrounding the said rim of the driven clutch element, an expansible clutch shoe located within the said rim, and means connected with the said motor-connected driving element for expanding the said clutch shoe to force it into engagement with the said rim which is thereby also expanded and forced into engagement with the motor-connected driving element.

3. In a transmission gearing, the combination of a driven shaft, a clutch element secured thereto having an expansible rim, a motor-connected driving element surrounding the said rim of the shaft-connected clutch member and having a face concentric with the outer face of the rim of the latter, a clutch shoe located within the said rim and adapted to be moved into driving engagement therewith and to expand the latter into engagement with the motor connected driving element that surrounds it, means for expanding the clutch shoe, and means carried by the said motor-connected driving element adapted to be brought into engagement with the clutch-shoe-expanding means and to rotate the latter with the said driving and clutch elements after the clutch shoe has been expanded.

4. In a transmission gearing, the combination of a pair of driven shafts arranged in alinement with their ends close together, a driven, expansible, cup-shaped clutch element secured to each shaft near its end, a casing inclosing the said driven clutch elements, and free to rotate relative thereto, a drive wheel secured to the said casing, clutch shoes located within the cup-shaped driven clutch elements and arranged to engage therewith and expand the latter into driving engagement with the casing, means for expanding the clutch shoes into working engagement with the driven shaft-connected clutch elements, and means carried by the said rotating casing for operating the said clutch-shoe-expanding means.

5. In a transmission gearing, the combination of a driven shaft, a cup-shaped clutch element secured thereto having a rim that is slit to render it expansible, a driving casing surrounding the driven clutch element, the inner face of the casing being in close running engagement with the outer face of the rim of the shaft-connected clutch member, and means operated by the said driving casing for forcing the said expansible rim into working engagement with the inner face of the driving casing.

6. In a transmission gearing, the combination of a motor-connected driving member, a shaft to be driven, a clutch member fixedly connected with the shaft, and means operated by the driving member for expanding the shaft-connected clutch member into direct engagement with the driving member.

7. In a transmission gearing, the combination of a motor-connected driving member, a driven shaft, a clutch member fixedly connected with the shaft and adapted to have frictional working engagement with the said driving member, and means operated by the driving member for expanding the said clutch member into frictional working engagement with the driving member.

8. In a transmission gearing, the combination of a pair of driven shafts in alinement with each other, a common driving element for the said shafts surrounding the inner portions thereof and rotatable about the axis of the shafts, cup-shaped clutch elements connected with the shafts spaced apart and arranged within the said driving element, clutch shoes located within the cup-shaped shaft-connected clutch members arranged to be forced into working engagement therewith, expanding blocks for the said clutch shoes provided with arms lying in the space between the driven cup-shaped clutch elements, and means carried by the said surrounding driving element also located in the space between the cup-shaped clutch elements and arranged to engage with the arms of the clutch-expanding blocks to operate them to expand the clutch shoes and also to cause them to turn with the driving element, the said arms of the expanding blocks being free to be disengaged from the means that engage with and operate them whenever the driven shaft with which an arm is associated revolves faster than does the other driven shaft.

9. In a transmission gearing, the combination of a pair of driven shafts, in alinement with each other and with their ends close together, a driving casing surrounding the inner ends of the driven shafts and concentric therewith, and drive connections between the said casing and the driven shafts, including a clutch element secured to one of the shafts, an expansible friction shoe coöperating with the shaft-connected clutch element, a block for expanding the shoe having a laterally extending arm provided with an inclined face, and a driving wedge secured to the inner face of the casing arranged to be brought into engagement with the inclined face of the arm of the shoe-expanding-block to operate the latter when the casing is turned in one direction, and to be separated from the said arm whenever the shaft driven thereby speeds up or overruns.

10. In a transmission gearing, the combination of a pair of driven shafts in alinement with each other, a driving casing surrounding the inner ends of the driven shafts and concentric therewith, and driving connections between the casing and the driven shafts, including a clutch element secured to one of the shafts, an expansible friction shoe coöperating with said clutch element, a piece for expanding the shoe having arms extending therefrom laterally and in opposite directions, and driving pieces secured to the inner face of the casing and arranged to be brought respectively into engagement with one or the other of the arms of the shoe-expanding piece to operate the latter, as the casing is turned in one direction or the other, and each piece being arranged also to be separated from the arms whenever the driven shaft is turned at a speed greater than the speed imparted by the driving casing.

CHRISTOPHER W. LEVALLEY.

Copies of this patent may be obtained for five cents each, by addressing the "Commissioner of Patents, Washington, D. C."